US007117845B2

(12) United States Patent
Iwaoka et al.

(10) Patent No.: US 7,117,845 B2
(45) Date of Patent: Oct. 10, 2006

(54) INTAKE CONTROL DEVICE FOR INTERNAL COMBUSTION ENGINE

(75) Inventors: Shin Iwaoka, Kariya (JP); Hiroshi Tanimura, Kariya (JP); Hiroki Shimada, Obu (JP)

(73) Assignee: Denso Corporation, (JP)

( * ) Notice: Subject to any disclaimer, the term of this patent is extended or adjusted under 35 U.S.C. 154(b) by 0 days.

(21) Appl. No.: 11/172,915

(22) Filed: Jul. 5, 2005

(65) Prior Publication Data

US 2006/0000445 A1 Jan. 5, 2006

(30) Foreign Application Priority Data

Jul. 5, 2004 (JP) ............................ 2004-198245

(51) Int. Cl.
*F02D 9/08* (2006.01)
*F16K 1/22* (2006.01)

(52) U.S. Cl. ...................................................... 123/337

(58) Field of Classification Search ................ 123/337, 123/399; 251/305

See application file for complete search history.

(56) References Cited

U.S. PATENT DOCUMENTS

| | | | | |
|---|---|---|---|---|
| 5,704,335 | A | 1/1998 | Akutagawa et al. | 123/337 |
| 5,718,202 | A * | 2/1998 | Bentz et al. | 123/399 |
| 5,979,405 | A * | 11/1999 | Sato et al. | 123/399 |
| 6,352,241 | B1 * | 3/2002 | Hannewald et al. | 251/129.11 |
| 6,371,080 | B1 * | 4/2002 | Saito et al. | 123/337 |
| 6,435,473 | B1 * | 8/2002 | Dall'Osso et al. | 251/129.11 |
| 6,505,643 | B1 * | 1/2003 | Scholten et al. | 137/554 |
| 6,626,142 | B1 * | 9/2003 | Tokiya et al. | 123/337 |
| 6,646,395 | B1 * | 11/2003 | Reimann | 318/254 |
| 6,761,348 | B1 * | 7/2004 | Michels et al. | 251/305 |
| 6,763,582 | B1 * | 7/2004 | Kaiser et al. | 29/854 |
| 6,772,730 | B1 * | 8/2004 | Kohlen | 123/337 |
| 6,860,466 | B1 * | 3/2005 | Sakurai et al. | 251/129.11 |
| 6,871,631 | B1 * | 3/2005 | Bender | 123/337 |
| 6,874,466 | B1 * | 4/2005 | Shibata et al. | 123/337 |
| 6,880,522 | B1 * | 4/2005 | Kino et al. | 123/337 |
| 6,886,806 | B1 * | 5/2005 | Borasch et al. | 251/305 |
| 6,892,698 | B1 * | 5/2005 | Kino et al. | 123/337 |
| 6,973,917 | B1 * | 12/2005 | Shimada | 123/399 |
| 6,997,163 | B1 * | 2/2006 | Arai et al. | 123/399 |
| 7,011,073 | B1 * | 3/2006 | Hannewald | 123/337 |
| 2004/0079327 | A1 * | 4/2004 | Andoh et al. | 123/337 |
| 2005/0022781 | A1 * | 2/2005 | Arai et al. | 123/337 |
| 2005/0022786 | A1 * | 2/2005 | Arai et al. | 123/399 |
| 2005/0022787 | A1 * | 2/2005 | Arai et al. | 123/399 |
| 2005/0263131 | A1 * | 12/2005 | Tanimura et al. | 123/337 |

FOREIGN PATENT DOCUMENTS

| | | |
|---|---|---|
| JP | 2003-522869 | 7/2003 |

* cited by examiner

*Primary Examiner*—Hai Huynh
(74) *Attorney, Agent, or Firm*—Nixon & Vanderhye PC

(57) ABSTRACT

An intake control device includes a throttle valve and a throttle body. The throttle valve rotates to control intake air. The throttle body includes a cylindrical throttle bore portion defining a circular throttle bore that accommodates the throttle valve. The throttle body includes a cylindrical motor housing portion arranged on the radially outer side of the throttle bore portion. The motor housing portion defines a motor accommodating hole, in which a motor is accommodated to rotate the throttle valve. The throttle body includes a flange portion that extends from one axial end of the throttle bore portion to the radially outer side thereof. The throttle body is connected to the engine via the flange portion. The throttle body is formed of resin integrally with a housing connecting rib that connects the flange portion directly with the motor housing portion.

8 Claims, 8 Drawing Sheets

INTAKE CONTROL DEVICE FOR INTERNAL COMBUSTION ENGINE

CROSS REFERENCE TO RELATED APPLICATIONS

This application is based on and incorporates herein by reference Japanese Patent Application No. 2004-198245 filed on Jul. 5, 2004.

FIELD OF THE INVENTION

The present invention relates to an intake control device for an internal combustion engine, the intake control device controlling opening degree of a throttle valve, which is rotatably supported by a throttle body, using a motor in accordance with an accelerator position operated by a driver.

BACKGROUND OF THE INVENTION

A conventional intake control device for an internal combustion engine controls opening degree of a throttle valve at a predetermined opening degree by operating a motor in accordance with an accelerator position operated by a driver.

The clearance between the surface of a throttle bore of a throttle body and the outer periphery of the throttle valve, when the throttle valve is in a full-closing position, exerts a large influence to a performance in air tightness of the intake control device. Therefore, the clearance between the surface of the throttle bore of the throttle body and the outer periphery of the throttle valve needs to be accurate in dimension. The intake control device may be used in a cold climate such as winter. Moisture may be contained in intake air drawn into respective cylinders of the engine through an intake pipe accommodating the throttle body. Moisture contained in intake air may adhere to the surface of the throttle valve, and the moisture may be cooled. When the moisture is frozen throughout the surface of the throttle bore and the outer periphery of the throttle valve, the throttle valve may stick to the surface of the throttle bore of the throttle body. Accordingly, the throttle valve needs to be restricted from being frozen.

As shown in FIG. 5, a throttle body 101 has an internal double-pipe structure, which is constructed of a bore inner pipe 102 and a bore outer pipe 103, according to U.S. Pat. No. 5,704,335 (JP-A-09-032590), for example.

Intake air flows into the respective cylinders of the engine through the bore inner pipe 102. The bore outer pipe 103 is arranged on the radially outer side of the bore inner pipe 102 to form an annular space therebetween. The bore inner pipe 102 is floated from the bore outer pipe 103, which constructs the outer shell of the throttle body 101, so that moisture, which flows along the inner periphery of the intake pipe on the upstream side, can be trapped in the annular space. Thus, the throttle valve 104 can be restricted from being frozen to the surface of the throttle bore formed in the bore inner pipe 102. Furthermore, the throttle body 101 is formed of resin, so that manufacturing cost and weight of the throttle body 101 can be reduced. In this structure, deformation in the throttle body 101, which is caused due to contraction after molding and/or assembling, do not directly exert influence against the inner diametrical dimension of the throttle bore in the bore inner pipe 102, even when the throttle body 101 is molded of thermoplastic resin in an injection molding die. Thereby, accuracy of the inner diametrical dimension of the throttle bore of the bore inner pipe 102 can be enhanced.

A driving unit, which operates the throttle valve 104 and a throttle shaft 105, is constructed of a motor, i.e., a power source 106 and a transmission mechanism (reduction gears), which transmits rotation power of the motor 106 to the throttle valve 104. The reduction gears are constructed of a pinion gear 110, an intermediate gear 111, and a valve gear 112. The pinion gear 110 is fixed to a motor shaft 109 of the motor 106. The intermediate gear 111 engages with the pinion gear 110 to be rotated. The valve gear 112 engages with the intermediate gear 111 to be rotated. A throttle opening sensor is mounted to the outer wall of the throttle body 101. The throttle opening sensor includes a permanent magnet 113 and a non-contact type magnetism detecting element 114. The permanent magnet 113 is secured to the inner periphery of the valve gear 112, which is connected to one axial end of the throttle shaft 105. The magnetism detecting element 114 generates electromotive force in accordance with a magnetic field generated by the permanent magnet 113. The magnetism detecting element 114 is fixed to a sensor mount part 116 provided to a sensor cover 115, which is connected to the outer wall of the throttle body 101, in a manner to be arranged in opposition to the inner peripheral surface of a yoke, which is magnetized by the permanent magnet 113. A return spring 117 is provided to a gap between the bore outer pipe 103 and the valve gear 112 to bias the throttle valve 104 to the side, in which the throttle valve 104 is closed.

A cylindrical motor housing portion 122 and a gearbox portion 124 are formed of resin integrally with the outer wall of the bore outer pipe 103 in the throttle body 101. The motor housing portion 122 has a motor accommodating hole 121, in which the motor 106 is accommodated. The gearbox portion 124 has a gear chamber 123 that rotatably accommodates the reduction gears. Here, vibration of the engine is directly transmitted to the throttle body 101. Therefore, as shown in FIGS. 6 to 8, multiple reinforcement ribs 125 are formed integrally with the outer periphery of the sidewall of the motor housing portion 122 along the axial direction of the motor accommodating hole 121, for example. Besides, multiple reinforcement ribs 125 are radially formed integrally with the outer periphery of the bottom wall of the motor housing portion 122, for example. Thereby, rigidity of the motor housing portion 122, which accommodates the motor 106, is enhanced to be sustainable against vibration of the engine. In the throttle body 101, the outer wall of the bore outer pipe 103 and the sidewall of the motor housing portion 122 are directly connected via multiple housing connecting ribs 127, which are formed of multiple plate-shaped connecting ribs, to reduce vibration of the motor 103.

In the above conventional structure, the outer wall of the bore outer pipe 103 of the throttle body 101, which has the double pipe structure, and the sidewall of the motor housing portion 122 are connected via the housing connecting ribs 127. However, the housing connecting ribs 127 needs to support the motor housing portion 122, which accommodates the motor 106 heavier than the resinous throttle body 101. Accordingly, the housing connecting ribs 127 need to be sufficiently rigid. Therefore, the thickness of the housing connecting ribs 127 is increased to reinforce the housing connecting ribs 127. Besides, the housing connecting ribs 127, which are provided along the axial direction of the bore outer pipe 103, are formed to have the width thereof (FIGS. 7, 8), which is equivalent to the diameter of the motor housing portion 122, to reinforce the housing connecting ribs 127.

However, in this structure, deformation in the motor housing portion 122 such as contract after forming thereof may be propagated to the bore inner pipe 102 via the housing connecting ribs 127, the bore outer pipe 103 and an annular connecting portion that connects the outer periphery of the bore inner pipe 102 with the inner periphery of the bore outer pipe 103. Besides, when a flange portion 129, which is integrally formed with an axial end of the bore outer pipe 103, is mounted to a bracket, which is fixed to the intake manifold of the engine in the vehicle, the flange portion 129 may deform. The deformation of the flange portion 129 may be propagated to the bore inner pipe 102 via the annular connecting portion. In these situations, the throttle bore in the bore inner pipe 102 may be degraded in dimensional accuracy. Accordingly, the throttle bore deforms in the bore inner pipe 102, and the roundness of the throttle bore deteriorates. As a result, air tightness of the throttle valve 104 in the full-closing position may be degraded, and a leakage amount of intake air increases in the full-closing position in an idling operation. Accordingly, the idling speed may become larger than a predetermined idling speed, and fuel consumption may increase in the idling operation.

Furthermore, when the throttle bore of the bore inner pipe 102 becomes out of a predetermined roundness, the throttle bore may interfere with the outer periphery of the throttle valve 104, when the throttle valve 104 is rotated. In this case, the throttle valve 104 may not be properly operated, and a valve-lock, i.e., seizure may be caused in the throttle valve 104. As a result, the throttle opening degree may not conform to the accelerator position, and drivability may be degraded.

SUMMARY OF THE INVENTION

In view of the foregoing problems, it is an object of the present invention to provide an intake control device for an internal combustion engine, the intake control device having a structure, in which deformation arising after forming a throttle body is not apt to exert influence directly against the diameter of a throttle bore of the throttle body, even when the throttle body is integrally formed of resin. Specifically, contraction after forming the throttle body and deformation arising in a flange of the throttle body after mounting the throttle body to the engine via the flange, are not apt to directly exert influence against the diameter of a throttle bore of the throttle body, so that the clearance between the throttle bore and the outer periphery of the throttle valve can be enhanced.

It is another object of the present invention to provide an intake control device for an engine, the intake control device being capable of restricting an amount of intake air leaking in an idling operation, in which a throttle valve is in a full-closing position. Furthermore, it is another object of the present invention to provide an intake control device, in which a throttle valve is capable of being restricted from causing a failure in operation and is capable of being restricted from causing seizure in movement thereof.

According to the present invention, an intake control device for an internal combustion engine includes a throttle valve and a throttle body. The throttle valve rotates to control an amount of intake air flowing into a combustion chamber of the internal combustion engine. The throttle body includes a throttle bore portion that is in a substantially cylindrical shape. The throttle bore portion defines a throttle bore that is in a substantially circular shape. The throttle valve is accommodated in the throttle bore. The throttle body further includes a motor housing portion, which is in a substantially cylindrical shape, arranged on the outer side of the throttle bore portion with respect to the radial direction of the throttle bore portion. The radial direction of the throttle bore portion is substantially perpendicular to the axial direction of the throttle bore portion. The motor housing portion defines a motor accommodating hole, in which a motor is accommodated to rotate the throttle valve. The throttle body further includes a flange portion that extends from a first axial end portion of the throttle bore portion to the outer side in the radial direction of the throttle bore portion. The throttle body is connected to a supporting member, which is fixed to the internal combustion engine, via the flange portion. The throttle body is formed of resin integrally with a housing connecting rib that connects the flange portion directly with the motor housing portion.

In this structure, the housing connecting rib, which support the motor housing portion, is directly connected with the flange portion, so that rigidity and strength of the housing connecting rib can be enhanced. Thereby, the housing connecting rib can steadily support the motor housing portion, which accommodates the motor being a component heavier than the throttle body.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

[First Embodiment]

Figure 1:
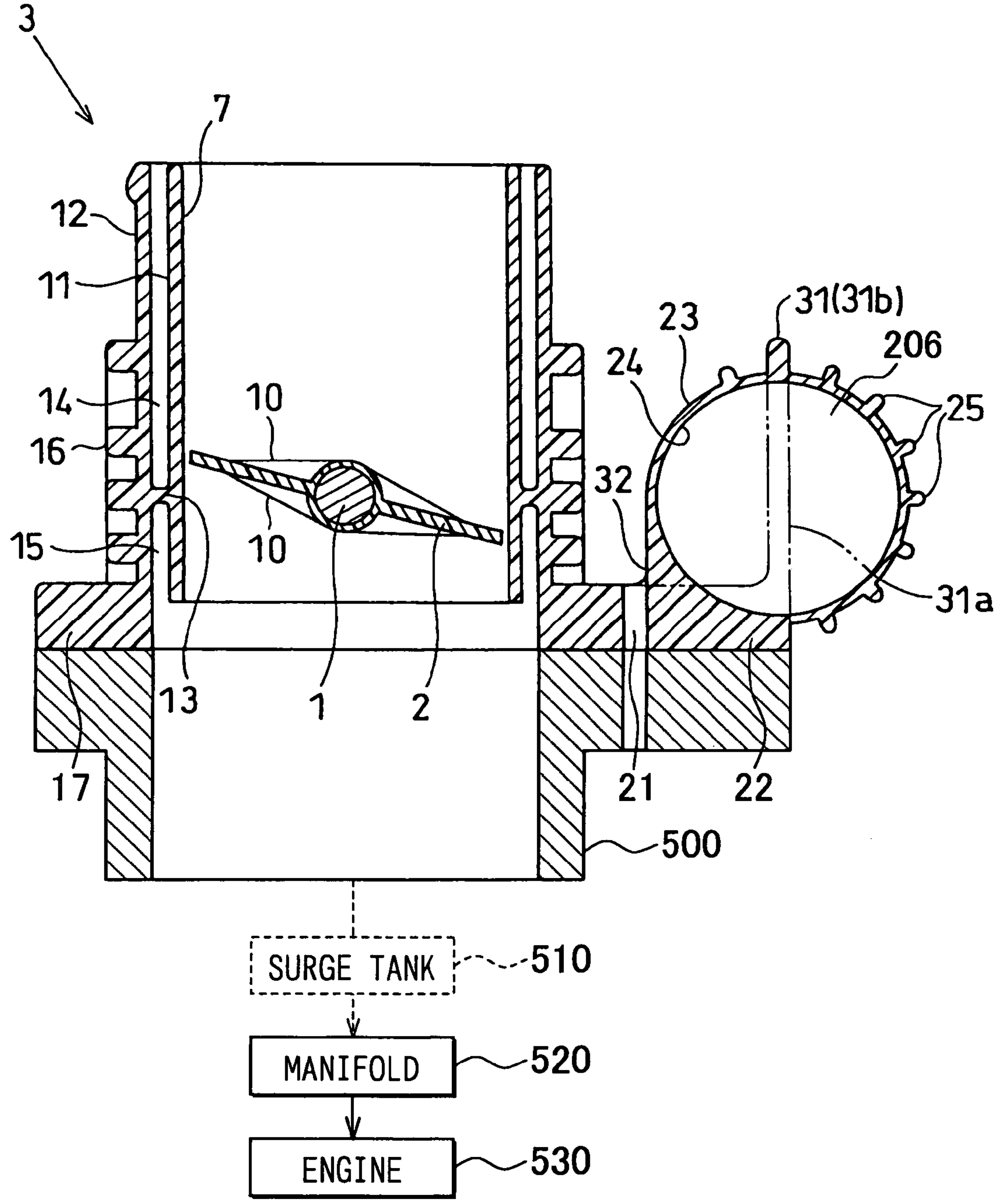
FIG. 1 is a cross sectional side view showing an intake control device for an internal combustion engine according to a first embodiment of the present invention.

An intake control device (intake air control device) is provided to a vehicle such as an automobile. The intake control device changes an amount of intake air flowing into respective cylinders (combustion chambers) of an internal combustion engine such as a gasoline engine, in accordance with an accelerator position operated by a driver to control engine rotation speed and engine torque.

As shown in FIGS. 1 to 4, the intake control device includes a motor 206, a throttle shaft 1, a throttle valve 2, a return spring (not shown), a throttle body 3, and an ECU (engine control unit). The motor 206 is operated in accordance with an accelerator position operated by a driver. The throttle shaft 1 is driven by the motor 206. The throttle valve 2 is a butterfly-type valve rotated together with the throttle shaft 1. The return spring biases the throttle valve 2 to the direction, in which the throttle valve 2 is in a full-closing position. The throttle body 3 rotatably receives the throttle valve 2. The ECU electronically controls the motor 206 in accordance with the accelerator position.

The ECU is connected with an accelerator position sensor (not shown) that converts the accelerator position, which is a degree of the accelerator stepped by the driver, to an electronic signal (accelerator position signal) to output the accelerator position signal to the ECU. The intake control device includes a rotation angular sensor (throttle position sensor) that converts an opening degree, i.e., the rotation angle (angular position) of the throttle valve 2 to an electronic signal (throttle position signal) to output the throttle position signal to the ECU. The ECU conducts a feedback control by proportional-plus-integral-plus-derivative control (PID control) on the motor 206, so that a deviation between the throttle position signal from the rotation angular sensor and the accelerator position signal from the accelerator position sensor decreases.

The rotation angular sensor is a throttle position sensor that detects a throttle opening degree (throttle position) corresponding to the rotation angle (valve angle) of the throttle valve 2. The rotation angular sensor includes a split type permanent magnet, a split type yoke (not shown), and a non-contact type magnetism detecting element (not shown). The permanent magnet (magnetic power source) is in a substantially rectangular shape, and is mounted to one axial end (first axial end) of the throttle shaft 1. The split type yoke is in a substantially arch-shape, and is magnetized by the magnet. The magnetism detecting element such as a hall element, a hall IC, and a magnetic resistance element is opposed to the inner periphery of the yoke. The magnetism detecting element receives magnetism generated by the magnets to detect the angular position of the throttle valve 2. The rotational angular sensor, specifically the magnetism detecting element is provided integrally with a sensor cover 5. The magnets and yokes are fixed to the inner periphery of a valve gear, which is a component of the reduction gear, using glue or the like.

The sensor cover 5 and a gearbox portion 4 construct an actuator case in this embodiment. The gearbox portion 4 is formed of resin integrally with the outer periphery of the throttle body 3. The sensor cover 5 closes an opening of the gearbox portion 4, and holds the magnetism detecting element, terminals, and a stator of the rotational angular sensor. The gearbox portion 4 is formed of resin to define a gear chamber that rotatably accommodates the reduction gear.

The sensor cover 5 is formed of thermoplastic resin that is electrically insulative among components such as the terminals of the rotational angular sensor and power terminals of the motor 206. The sensor cover 5 has an engaged portion that is engaged with an engaging portion provided to the opening side of the gearbox portion 4. The sensor cover 5 is assembled to the opening end side of the gearbox portion 4 using a rivet, a screw, by means of thermal crimping, or the like. The sensor cover 5 is formed of resin integrally with a substantially cylindrical receptacle (connector shell) 6, to which a connector (not shown) is electrically connected. The receptacle 6 holds multiple connector pins **6*a* that constructs the terminals of the rotational angular sensor and the power terminals of the motor 206**.

The motor 206 and the reduction gear, which transmits rotational torque of the motor 206 to the throttle valve 2 via the throttle shaft 1, construct a power unit that opens and closes the throttle valve 2 via the throttle shaft 1. The motor 206 is electrically connected integrally with the power terminals of the motor 206. The power terminals of the motor 206 are embedded in the sensor cover 5. The motor 206 serves as an electric actuator (driving source) that is energized, so that a motor shaft (not shown) is rotated in at least one of the forward direction and the reverse direction. The throttle body 3 has an insertion hole, into which the motor 206 is inserted. The motor 206 has a front end flame that is secured around the insertion hole of the throttle body 3 using a screw, for example. The reduction gear is constructed of a pinion gear, an intermediate gear, and a valve gear. The pinion gear is fixed to the outer periphery of the motor shaft of the motor 206. The intermediate gear engages with the pinion gear to be rotated. The valve gear engages with the intermediate gear to be rotated. The reduction gear serves as a power transmission mechanism that transits rotational power, i.e., rotational torque of the motor 206 to the throttle shaft 1.

The throttle shaft 1 is formed of a metallic material such as brass and stainless steel to be in a round-bar shape. The throttle shaft 1 serves as a rotational axis of the throttle valve 2. The rotational axis of the throttle shaft 1 is set to be substantially perpendicular to the axial direction of an average flow of intake air flowing through a throttle bore (intake passage) 7 of the throttle body 3. The rotational axis of the throttle shaft 1 is set to be in substantially parallel with the axial direction of a motor housing portion 23. The throttle shaft 1 has a valve-holding portion that holds the throttle valve 2. The throttle shaft 1 is insert-formed in a cylindrical portion of the throttle valve 2 such that the throttle shaft 1 radially penetrates the throttle valve 2 in the direction of the rotational axis thereof, so that the throttle shaft 1 reinforces the throttle valve 2.

Figure 2:
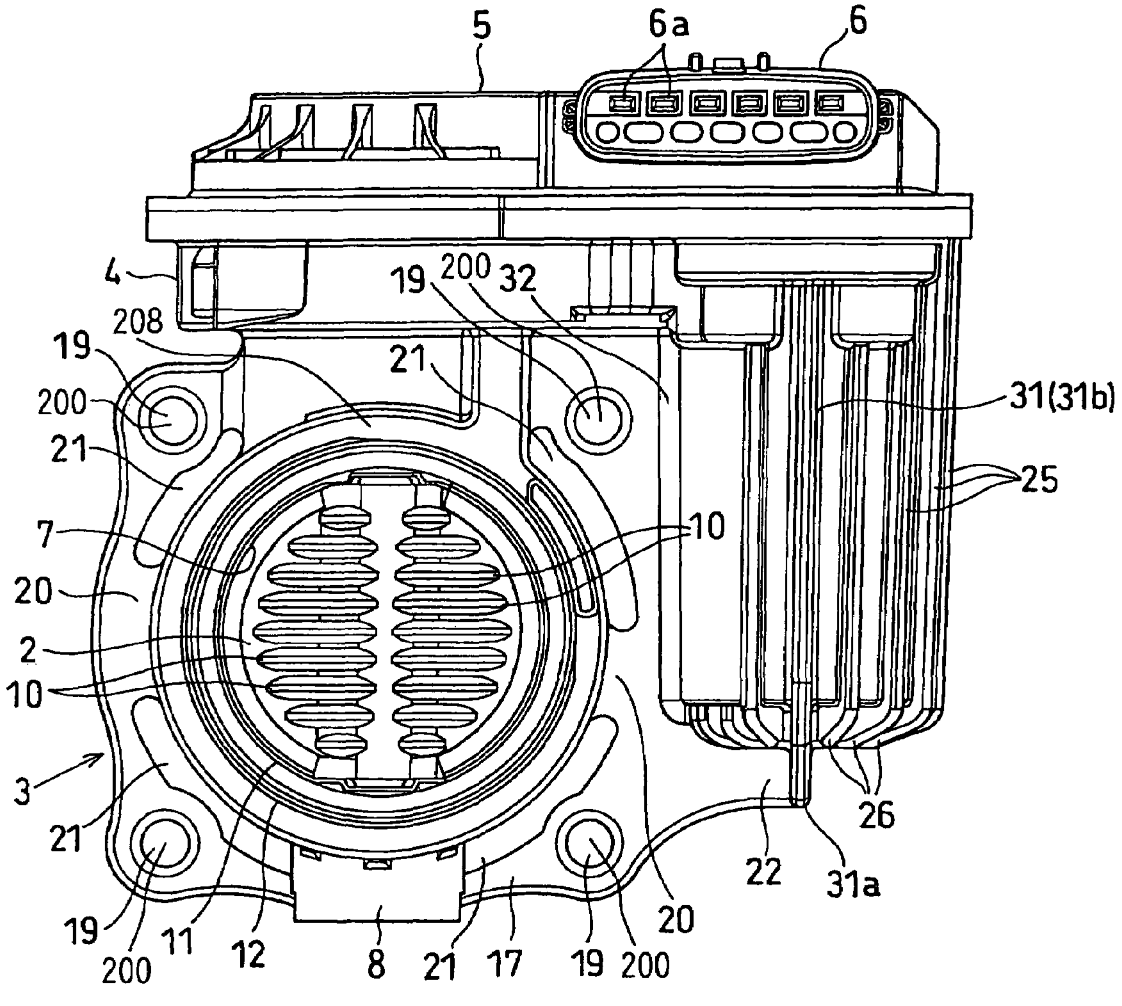
FIG. 2 is a top view showing the intake control device according to the first embodiment.
Figure 3:
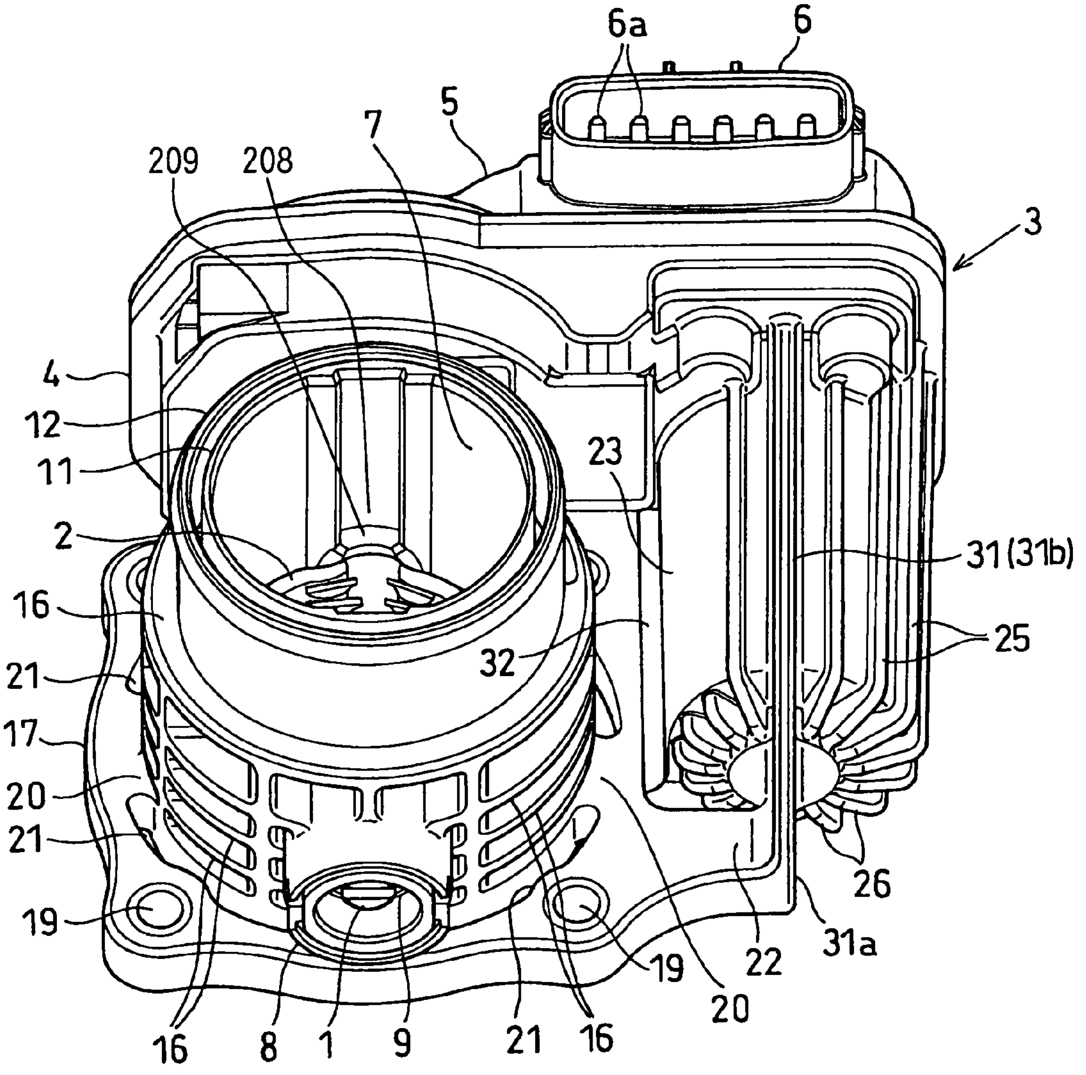
FIG. 3 is a perspective view showing the intake control device according to the first embodiment.
Figure 4:
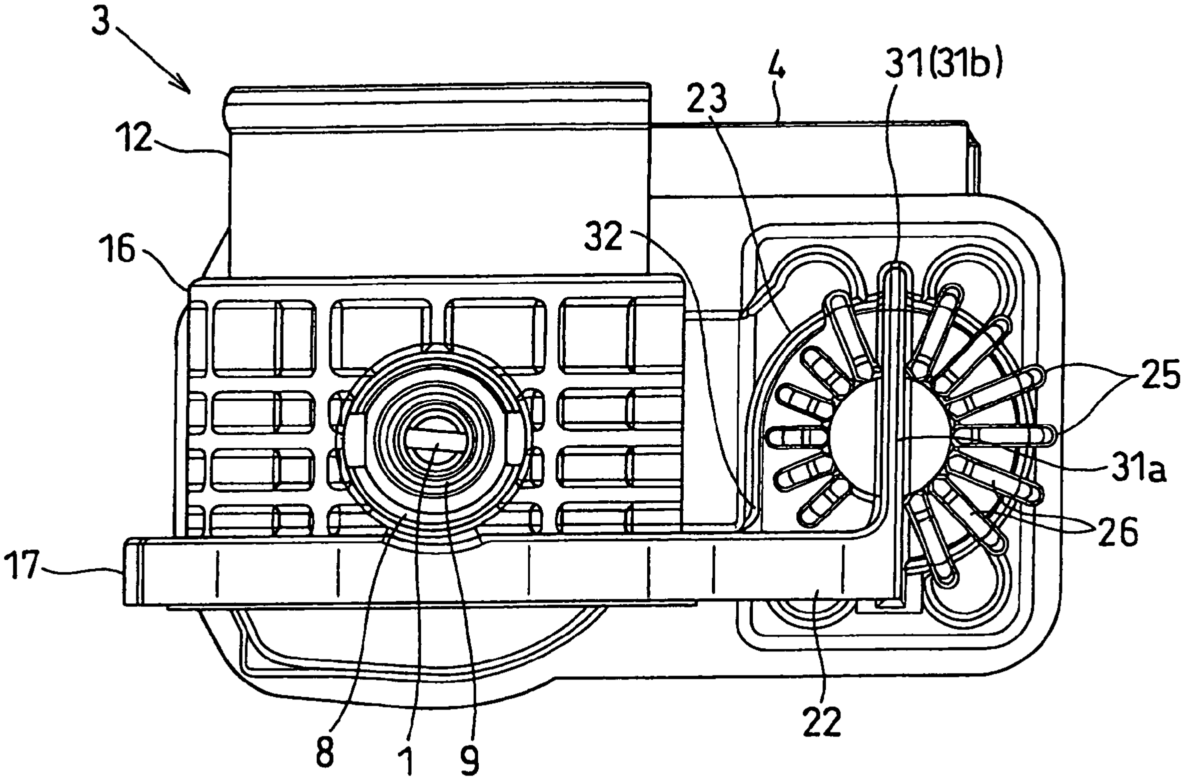
FIG. 4 is a side view showing the intake control device according to the first embodiment.
Figure 5:
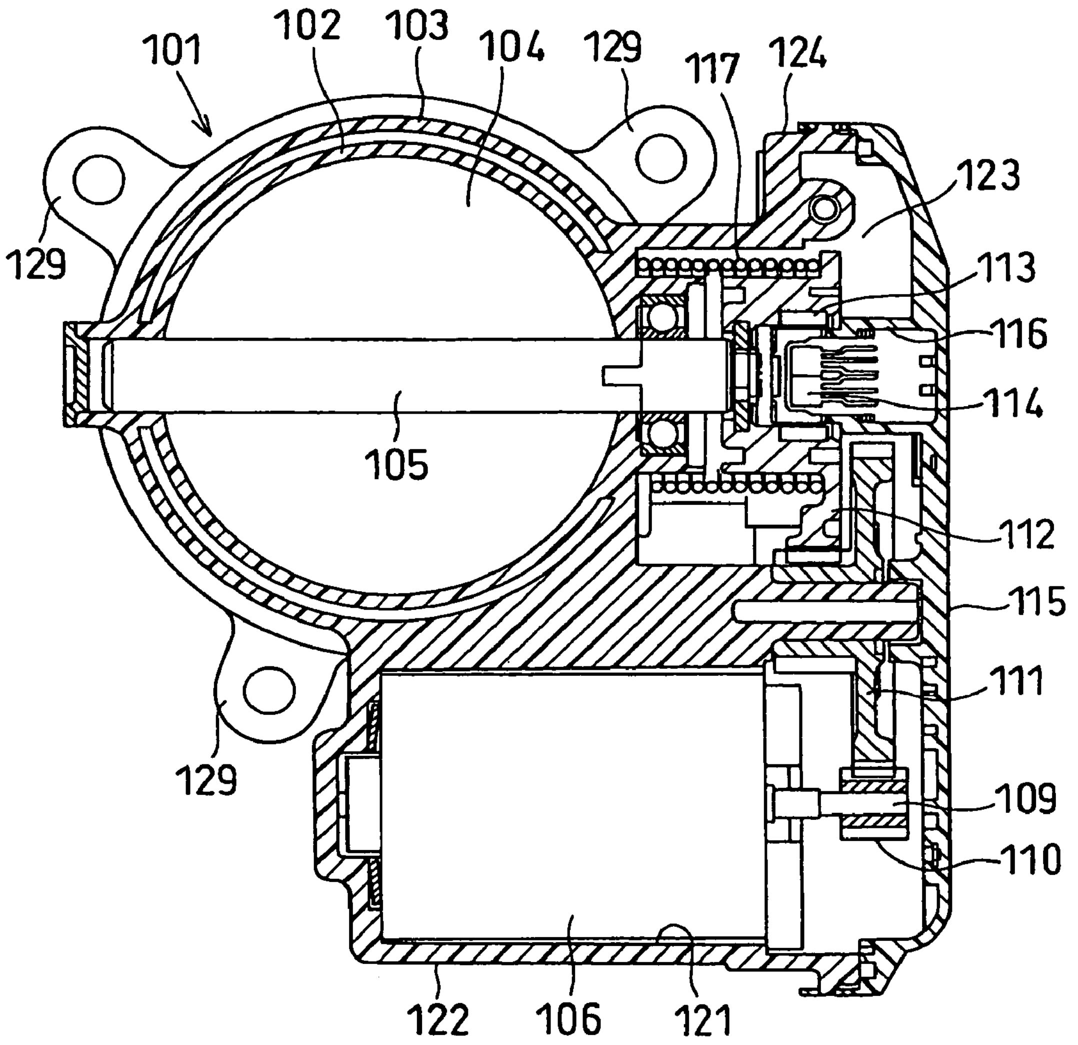
FIG. 5 PRIOR ART
FIG. 5 is a cross sectional top view showing an intake control device for an internal combustion engine according to a prior art.
Figure 6:
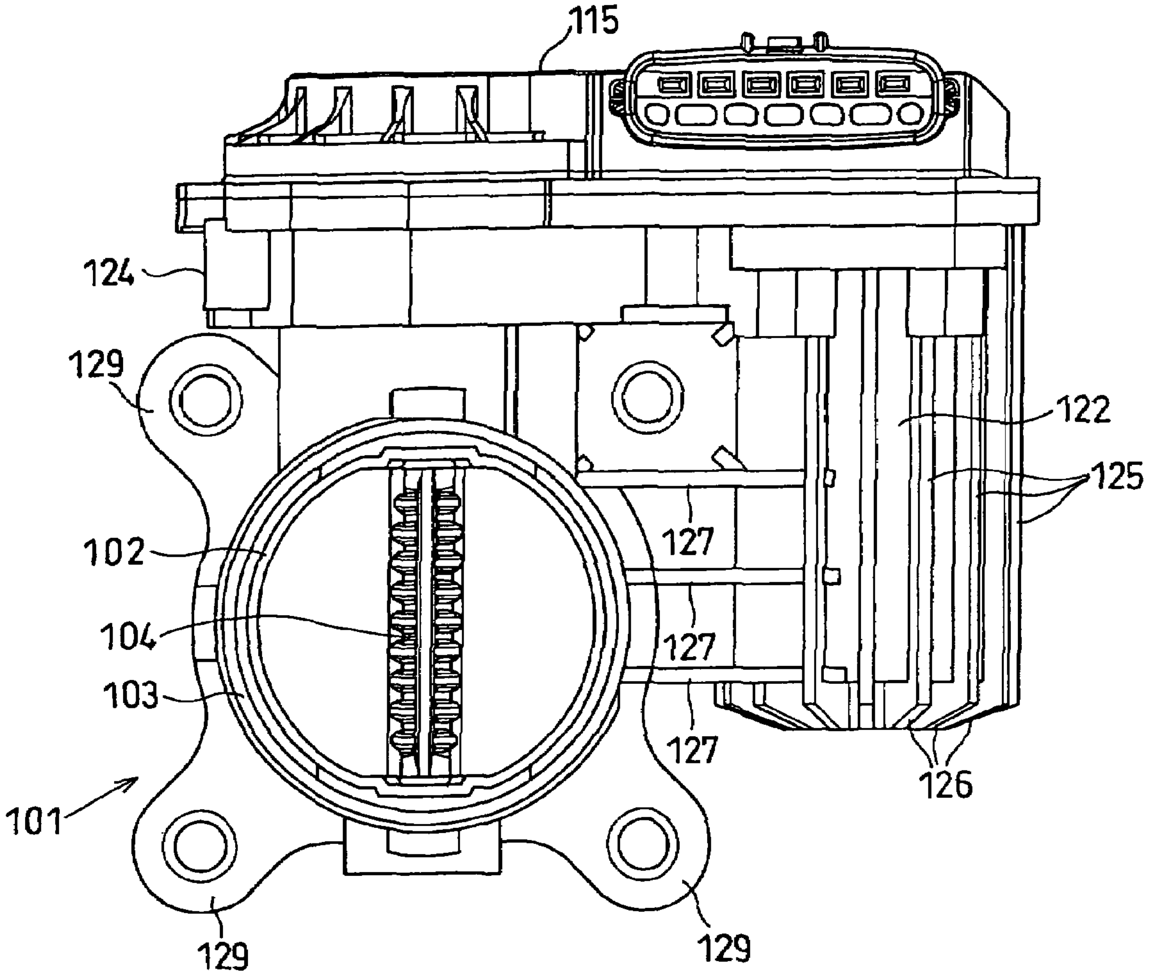
FIG. 6 PRIOR ART
FIG. 6 is a top view showing the intake control device according to the prior art.
Figure 7:
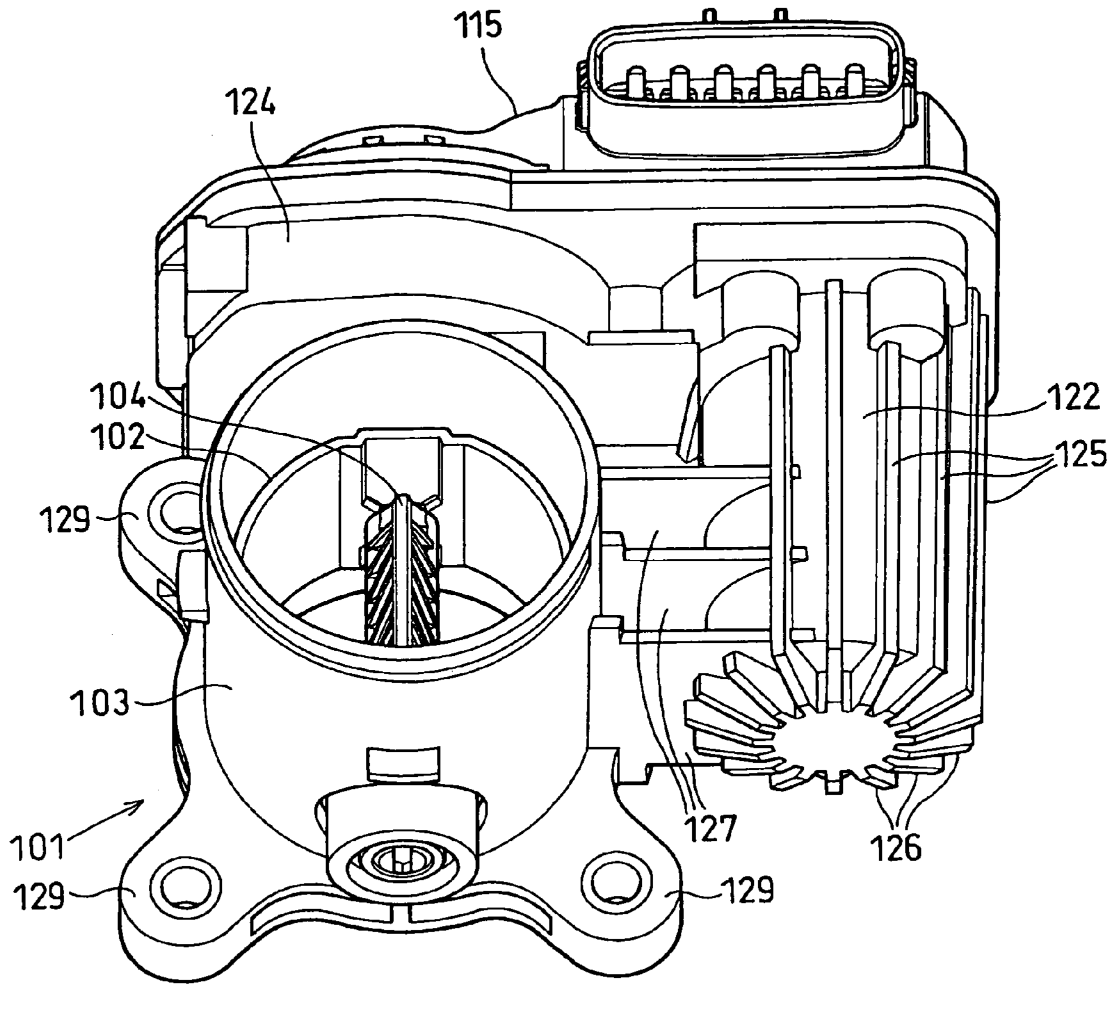
FIG. 7 PRIOR ART
FIG. 7 is a perspective view showing the intake control device according to the prior art.
Figure 8:
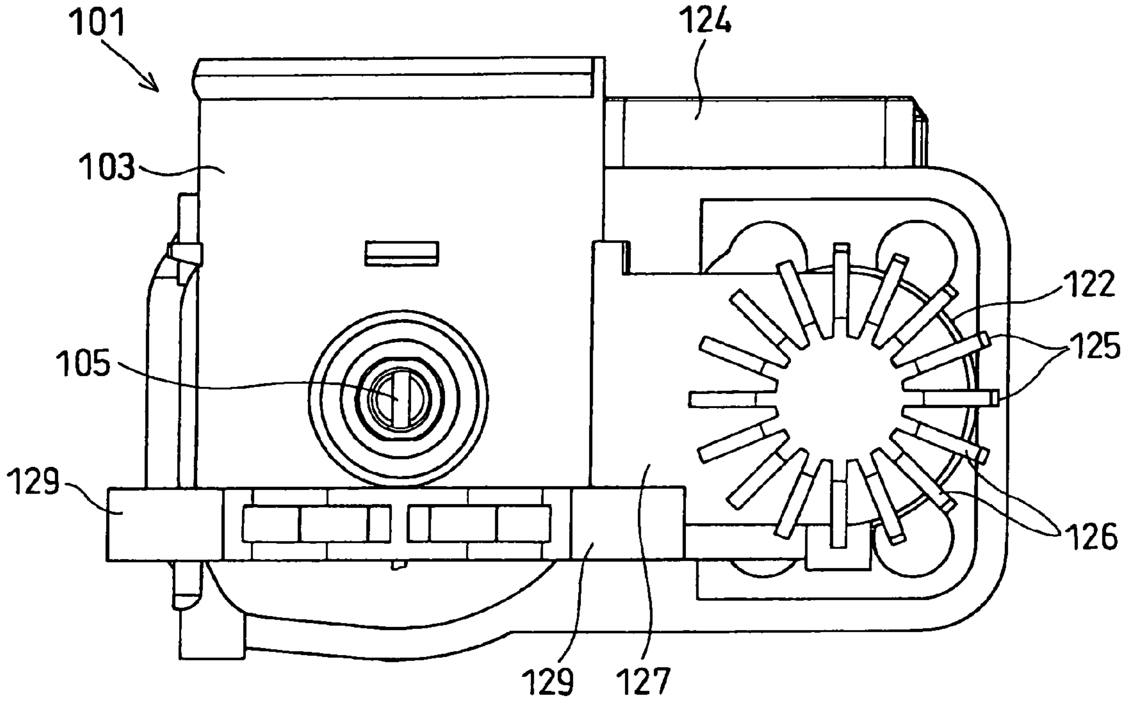
FIG. 8 PRIOR ART
FIG. 8 is a side view showing the intake control device according to the prior art.

The other axial end (second axial end) of the throttle shaft 1 on the lower side in FIGS. 2, 3 exposes, i.e., protrudes from the end face of a cylindrical portion of the throttle valve 2. The other axial end of the throttle shaft 1 serves as a first end portion that is rotatable in a first hole formed in a first bearing fixed to a first boss 8 of the throttle body 3. The one axial end of the throttle shaft 1 on the upper side in FIGS. 2, 3 exposes, i.e., protrudes from the end face of the cylindrical portion of the throttle valve 2. The one axial end of the throttle shaft 1 serves as a second end portion that is rotatable in a second hole formed in a second bearing 209 fixed to a second boss (not shown) of the throttle body 3. The one axial end of the throttle shaft 1 on the upper side in FIGS. 2, 3 is assembled integrally with the valve gear (not shown), which is a component of the reduction gear. The outer periphery of the valve gear is provided integrally with a block-shaped, i.e., protruding full-closing stopper portion (not shown). The gearbox portion 4 is provided integrally with a block-shaped, i.e., protruding full-closing stopper (not shown). The full-closing stopper portion of the valve gear latches onto the full-closing stopper of the gearbox portion 4, when the throttle valve 2 is in the full-closing position.

The throttle valve 2 is integrally formed of a resinous material such as thermally stable thermoplastic resin, for example, PPS (polyphenylene sulphide), PA (polyamide resin), PP (polypropylene), or PEI (polyetherimide) to be in a substantially disc-shape. The throttle valve 2 is a butterfly-type rotary valve (resinous valve). The rotational axis of the throttle valve 2 is set to be substantially perpendicular to the axial direction of an average flow of intake air flowing through the throttle bore 7 of the throttle body 3. The throttle valve 2 is controlled in rotational angle within a rotative range defined from the full-closing position, in which the amount of intake air becomes minimum, to the full-opening position, in which the amount of intake air becomes maximum. Thereby, the amount of intake air, which flows into the combustion chambers of the respective cylinders of the engine 530, is controlled. The throttle valve 2 is biased toward the full-closing position by the return spring.

The throttle valve 2 is constructed of a disc-shaped portion (resinous disc) and the cylindrical portion (resinous shaft). The disc-shaped portion is arranged around an intersection between the axis of the throttle bore 7 and the rotational axis of the throttle valve 2. The cylindrical portion penetrates the disc-shaped portion in the substantially radial direction of the disc-shaped portion in the throttle valve 2. An outer peripheral end portion (radially end portion) is provided to the outer periphery of the disc-shaped portion of the throttle valve 2. The outer peripheral end portion of the throttle valve 2 makes contact with the surface of the throttle bore (throttle bore inner surface) 7 of the throttle body 3 when the throttle valve 2 is in the full-closing position, in which the amount of intake air becomes minimum. At least one surface of the throttle valve 2 is formed of resin integrally with reinforcing ribs 10 to be reinforced, so that rigidity and strength of the throttle valve 2 is enhanced. The cylindrical portion of the throttle valve 2 is formed of resin integrally with the outer periphery of a valve-holding portion of the throttle shaft 1. Thereby, the throttle valve 2 and the throttle shaft 1 are integrated to be capable of integrally rotating.

The throttle body 3 is a thermoplastic resinous product that is integrally formed of a resinous material such as thermally stable thermoplastic resin, for example, PPS (polyphenylene sulphide), PA (polyamide resin), PP (polypropylene), or PEI (polyetherimide) to be in a predetermined shape. The thermoplastic resinous product such as the throttle body 3 is integrally formed in such a manner that a resinous material in a pellet shape is heated to be in a molten state, and the molten resinous material is press-injected into a cavity formed in a molding die. Subsequently, the injected resinous material is solidified in the cavity, and the solidified resinous material is taken of the molding die as the resinous product.

The throttle body 3 has the throttle bore (intake air passage) 7, in which the throttle valve 2 is rotatably supported. The throttle body 3 includes an air inlet portion (intake air passage) and an air outlet (intake air passage) that are integrally formed of resin. The air inlet portion has the diameter, which is substantially the same as the diameter of the air outlet portion along the direction, in which intake air flows through the throttle body 3 from the upper side to the lower side in FIG. 1. Intake air is drawn form an air cleaner (not shown) and an engine intake pipe (not shown) through the air inlet portion of the throttle body 3. The intake air flows to a surge tank 510 or an intake manifold 520 of the engine 530 after passing through the air outlet of the throttle body 3.

The throttle body 3 includes a throttle bore portion (cylindrical portion, cylindrical wall, bore wall portion) that has a double pipe structure, which is constructed of a cylindrical bore inner pipe (inner cylindrical portion) 11 and a cylindrical bore outer pipe (outer cylindrical portion) 12. The bore inner pipe 11 defines the throttle bore 7, which is in a circular shape in cross section. The bore outer pipe 12, which constructs the outer shell of the throttle body 3, is arranged on the radially outer side of the bore inner pipe 11. The bore inner pipe 11 rotatably accommodates the throttle valve 2 such that the throttle valve 2 can open and close the intake air passage formed in the bore inner pipe 11. Intake air drawn into the respective cylinders of the engine 530 flows through the throttle bore (intake air passage) 7 in the axial direction of the bore inner pipe 11. As referred to FIG. 1, the bore wall portion having the double pipe structure defines a cylindrical space, which is formed with the bore inner pipe 11 and the bore outer pipe 12. The cylindrical space is partitioned by an annular plate-shaped connecting rib (bore inner and outer pipes connecting rib, bore connecting rib) 13.

The bore connecting rib 13 connects the outer periphery of the bore inner pipe 11 with the inner periphery of the bore outer periphery 12 such that the bore connecting rib 13 blocks a part of the cylindrical space. Specifically, the bore connecting rib 13 circumferentially blocks the cylindrical space in the vicinity of the outer periphery of the throttle valve 2, which is in the full-closing position thereof. As referred to FIG. 1, the cylindrical space on the upstream side of the bore connecting rib 13 serves as a blocking concavity (moisture trapping groove) 14 that traps moisture flowing along the inner periphery of the intake air pipe. The cylindrical space on the downstream side of the bore connecting rib 13 serves as a blocking concavity (moisture trapping groove) 15 that traps moisture flowing along the inner periphery of the intake manifold 520.

The bore inner pipe 11 and the bore outer pipe 12 are integrally formed of resin with the substantially cylindrical first boss 8 and a substantially cylindrical second boss 208. The first boss 8 (first bearing supporting portion) rotatably supports a first sliding portion of the other axial end of the throttle shaft 1. The second boss (second bearing supporting portion) 208 rotatably supports a second sliding portion of the one axial end of the throttle shaft 1.

The first boss 8 has a first shaft hole, through which the other end of the throttle shaft 1 penetrates. A first bearing 9 is fixed to the inner periphery of the first shaft hole. The first bearing 9 has a first sliding hole that supports the first sliding portion of the other axial end of the throttle shaft 1 slidably in the rotational direction. The first boss 8 has an opening end on the side of the first shaft hole, and the opening end is plugged with an airtight plug (not shown). The second boss 208 has a second shaft hole, through which the one end of the throttle shaft 1 penetrates. The second bearing 209 is fixed to the inner periphery of the second shaft hole. The second bearing 209 has a second sliding hole that supports the second sliding portion of the one axial end of the throttle shaft 1 slidably in the rotational direction.

The first boss 8 is arranged on a one side (first side) with respective to the direction, which is substantially perpendicular to the axial direction of average flow of intake air flowing through the throttle bore 7 of the throttle body 3. The second boss 208 is arranged on the other side (second side) with respective to the direction, which is substantially perpendicular to the axial direction of the average flow of intake air flowing through the throttle bore 7 of the throttle body 3.

A lattice-shaped bore wall reinforcing ribs 16 are formed of resin integrally with the outer wall of the bore outer pipe 12. Specifically, the bore wall reinforcing ribs 16 are formed integrally with a part of the outer wall of the bore outer pipe 12, which is on the radially outer side of the outer periphery of the throttle valve 2 that is in a range, in which the outer periphery of the throttle valve 2 makes contact with or approaches to the bore inner periphery of the bore inner pipe 11 when the throttle valve 2 is around the full-closing position. The bore wall reinforcing ribs 16 reinforce the bore wall portion having the double-pipe structure, specifically, the bore wall reinforcing ribs 16 reinforce the bore outer pipe 12 to enhance rigidity and strength thereof.

The outer periphery of one end (first end) of the bore outer pipe 12 on the axially lower side in FIG. 1 is integrally formed with a collar-shaped (cornered angular shaped)

flange portion 17. The throttle body assembly, which is constructed of the throttle body 3 and components, is screwed to a mounting flange (bracket, supporting member) 500, which is fixed to one of the intake manifold 520 of the engine 530 and the surge tank 510 of the engine 530. The throttle body assembly is screwed via the flange portion 17 using a fastening member 200 such as a screw.

The flange portion 17 extends from the outer wall of the bore outer pipe 12 of the double-pipe structured bore wall portion on the one end side, i.e., on the lower side in FIG. 1 to the radially outer side. The flange portion 17 has multiple substantially circular bolt holes 19, through which the fastening members 200 penetrate. The throttle body 3 is formed of resin integrally with multiple flange connecting ribs 20 (FIG. 2) that connect the outer wall of the bore outer pipe 12 on the axially one end portion on the lower side in FIG. 1 with the inner periphery of the flange portion 17.

Multiple arch-shaped spaces (penetration holes) 21 are formed between the flange connecting ribs 20 which are adjacent to each other. That is, the arch-shaped spaces 21 are formed between the outer wall of the axially one end portion of the bore outer pipe 12 on the lower side in FIG. 1 and the inner periphery of the flange portion 17. When the flange portion 17 is mounted to the bracket 500 fixed to one of the intake manifold 520 of the engine 530 and the surge tank 510 of the engine 530, the flange portion 17 may deform. However, in this structure, the arch-shaped spaces 21 are formed, so that strain, i.e., deformation arising in the flange portion 17 hardly exerts influence against the double-pipe structured bore wall portion.

The flange portion 17 has an extending portion 22, which extends to the most outer side on the right side in FIG. 2. The extending portion 22 is formed of resin integrally with a motor housing portion 23, which accommodates the motor 206. The motor housing portion 23 is integrally formed of a resinous material, which is the same as that of the double-pipe structured bore wall portion.

The motor housing portion 23 is arranged on the right side of the gearbox portion 4, which is in a vessel shape accommodating the reduction gear, in FIG. 2. The motor housing portion 23 is spaced from the outer periphery of the bore outer pipe 12. The axial direction of the motor housing portion 23 is set to be substantially in parallel with the rotation center of the throttle shaft and the throttle valve 2. The axial direction of the motor housing portion 23 is set to be substantially perpendicular to the central axis of the throttle bore 7.

The motor housing portion 23 has a circular-shaped motor accommodating hole 24, in which the motor 206 is held. The bottom wall surface of the gearbox portion 4 has a motor insertion hole, through which the motor 206 is inserted into the motor accommodating hole 24 of the motor housing portion 23. The sidewall and the bottom wall of the motor housing portion 23 are formed of resin integrally with housing reinforcement ribs 25, 26 that reinforce the motor housing portion 23 to enhance rigidity and strength thereof. The housing reinforcement ribs 25 are in a block-shape or in a protrusion-shape, and are formed along the axial direction of the motor accommodating hole 24 of the motor housing portion 23. The housing reinforcement ribs 25 are arranged on the sidewall of the motor housing portion 23 circumferentially at predetermined intervals. The housing reinforcement ribs 26 respectively extend radially from the center of the bottom wall surface of the motor housing portion 23.

The extending portion 22 of the flange portion 17, the sidewall of the motor housing portion 23, and the bottom wall of the motor housing portion 23 are formed of resin integrally with housing connecting ribs 31, 32 to be connected with each other. The bore outer pipe 12 is separated from the motor housing portion 23. Thereby, deformation such as contraction arising after forming the motor housing 23 is not apt to directly exert influence against the diameter of the throttle bore in the bore inner pipe 11.

The housing connecting ribs 31, 32 are formed in a region excluding the region, in which the outer periphery of the throttle valve 2 makes contact with or approaches to the bore inner periphery of the bore inner pipe 11 when the throttle valve 2 is around the full-closing position. The housing connecting ribs 31, 32 are formed in a region excluding the first boss 8 and the second boss 208. The housing connecting ribs 31, 32 are formed in a region excluding the connecting portion, in which the outer periphery of the bore inner pipe 11 is connected with the inner periphery of the bore outer pipe 12 via the bore connecting rib 13.

The housing connecting rib 31 is formed integrally with at least one of the housing reinforcement ribs 25, 26. As referred to FIG. 4, the housing connecting rib 31 includes thick portions 31*a* and 31*b*. The thick portion 31*a* is in a substantially trapezoidal-shape or in a substantially semi-spherical-shape in cross section. The thick portion 31*a* upwardly extends from the right end portion of the extending portion 22 of the flange portion 17 in FIG. 4. The thick portion 31*a* extends substantially along the outer wall of the bottom wall of the motor housing portion 23. The thick portion 31*b* is in a substantially trapezoidal-shape or in a substantially semispherical-shape in cross section. The thick portion 31*b* is provided on the outer periphery of the sidewall of the motor housing portion 23. The thick portion 31*b* extends from the upper end portion of the thick portion 31*a* substantially along the axial direction of the motor housing portion 23.

As referred to FIG. 3, the housing connecting rib 32 is in a substantially trapezoidal-shape in cross section. The housing connecting rib 32 directly connects a portion, which is in the vicinity of the arch-shaped space 21 of the extending portion 22 of the flange portion 17, to the outer periphery of the sidewall of the motor housing portion 23. The housing connecting ribs 31, 32 directly connect to the extending portion 22 of the flange portion 17 via base portions, which have end surfaces on the side of the bore outer pipe 12. The end faces of the base portions are formed to be in curved surfaces having predetermined curvatures.

As follows, an operation of the intake control device is described. When the driver steps the accelerator pedal, the accelerator position signal, which is transmitted from the accelerator position sensor to the ECU, changes. The ECU controls electric power supplied to the motor 206, so that the motor shaft of the motor 206 is rotated and the throttle valve 2 is operated to be in a predetermined position. The torque of the motor 206 is transmitted to the valve gear via the pinion gear and the intermediate reduction gear. Thus, the valve gear rotates by a rotation angle corresponding to the stepping degree of the accelerator pedal, against bias of the return spring.

Therefore, the valve gear rotates, and the throttle shaft 1 also rotates by the same angle as the rotation angle of the valve gear, so that the throttle valve 2 rotates from the full-closing position toward the full-opening position in the opening direction. As a result, the air intake passage (throttle bore) 7 formed in the throttle body 3 is opened by a predetermined degree, so that rotation speed of the engine 530 is changed corresponding to the stepping degree of the accelerator pedal by the driver.

By contrast, when the driver releases the accelerator pedal, the throttle valve 2, the throttle shaft 1, the valve gear, and the like return to an initial position of the throttle valve 2 by bias of the return spring. The initial position of the throttle valve 2 is the full-closing position in the idling operation. When the driver releases the accelerator pedal, the value of the accelerator position signal transmitted by the accelerator position sensor becomes substantially 0%. Therefore, in this situation, the ECU can supply electric power to the motor 206 in order to rotate the motor shaft of the motor 206 in its reverse direction, so that the throttle valve 2 is controlled at the full-closing position. In this case, the throttle valve 2 can be rotated in the closing direction by the motor 206.

The housing connecting ribs 31, 32 need to support the motor housing portion 23, which accommodates the motor 206 being a component heavier than the resinous throttle body 3. Accordingly, the housing connecting ribs 31, 32 need to be sufficiently rigid. Therefore, the housing connecting ribs 31, 32, which support the motor housing portion 23, are directly connected with the extending portion 22 of the flange portion 17 to enhance rigidity and strength of the housing connecting ribs 31, 32. The housing reinforcement ribs 25, 26 are formed integrally with the outer periphery of the motor housing portion 23 circumferentially at the substantially predetermined intervals to enhance rigidity and strength of the motor housing portion 23. Here, reinforcing members such as metallic members may be insert-formed in the housing connecting ribs 31, 32, alternatively, the housing connecting ribs 31, 32 may be increased in thickness, to enhance rigidity and strength of the housing connecting ribs 31, 32.

The throttle body assembly includes components such as the motor 206, which is the heavy component, the throttle shaft 1, the throttle valve 2, the throttle body, the sensor cover 5, the rotational angular sensor, and the reduction gears. Accordingly, the throttle body assembly is apt to be heavy. The flange portion 17 supports the throttle body assembly on the end face of the bracket 500 secured to one of the intake manifold 520 of the engine 530 and the surge tank 510 of the engine 530. Therefore, the flange portion 17 needs to be sufficiently rigid and mechanically strong.

In this structure, the thickness of the flange portion 17 is set to be larger than the thickness of the bore inner pipe 11 and the thickness of the bore outer pipe 12 relative to the radial direction thereof. Thereby, the flange portion 17 is reinforced, so that rigidity and strength of the flange portion 17 can be enhanced. Furthermore, the bore wall reinforcing ribs 16 are formed integrally with the outer wall of the bore outer pipe 12 along the circumferential direction thereof to be in a predetermined shape such as the lattice-shape. Thereby, the bore outer pipe 12 is reinforced, so that rigidity and strength of the bore outer pipe 12 can be enhanced.

In this intake control device for the engine, the housing connecting ribs 31, 32 are integrally formed to connect the extending portion 22 of the flange portion 17 of the throttle body 3 directly with both the sidewall and the bottom wall of the motor housing portion 23. The housing connecting ribs 31, 32, which rigidly support the motor housing portion 23, are not connected directly with the outer wall of the bore outer pipe 12 having the double-pipe structure, but connected directly with the flange portion 17 to absorb vibration in the motor housing portion 23.

Thereby, in this structure, even when the motor housing portion 23 vibrates due to engine vibration, the vibration in the motor housing portion 23 is not apt to be propagated to the bore outer pipe 12 connected to the bore inner pipe 11 via the housing connecting ribs 31, 32.

Besides, even when strain and stress internally arise in the housing connecting ribs 31, 32 due to the vibration in the motor housing portion 23, the internal strain and internal stress are not apt to be propagated to the bore outer pipe 12 connected to the bore inner pipe 11 via the housing connecting ribs 31, 32.

Furthermore, when the throttle body 3 is integrally formed of resin, that is, thermoplastic resin is injection-molded in a molding die to produce the throttle body 3 as the resinous product, internal strain and internal stress may arise in the housing connecting ribs 31, 32, and the throttle body 3 may deform after forming of resin. In this situation, specifically contraction may arise in the flange portion 17 and the motor housing portion 23 after forming thereof. However, in this structure, strain and deformation in all the housing connecting ribs 31, 32, the flange portion 17, and the motor housing portion 23 are not apt to be propagated to the bore outer pipe 12 of the bore wall portion via the housing connecting ribs 31, 32. Thus, deformation in the throttle body 3, specifically, contraction in the bore outer pipe 12, the flange portion 17, and the motor housing portion 23 are not apt to exert influence directly to the diametric dimension of the throttle bore of the bore inner pipe 11.

Furthermore, the housing connecting ribs 31, 32 are avoided being arranged in the location, in which the flange portion 17 is connected to the bore outer pipe 12 on the axially end portion thereof. The housing connecting ribs 31, 32 are avoided being arranged in a part of the bore outer pipe 12 in the region, in which the outer periphery of the throttle valve 2 makes contact with or approaches to the bore inner periphery of the bore inner pipe 11 when the throttle valve 2 is in the full-closing position. The housing connecting ribs 31, 32 are avoided being arranged in a region, in which the first boss 8 and the second boss 208 are provided. The housing connecting ribs 31, 32 are avoided being arranged in the region around the bore connecting rib 13, via which the bore inner pipe 11 is connected with the bore outer pipe 12.

That is, the housing connecting ribs 31, 32 are apart from both the axially end portion of the bore outer pipe 12 and the part of the bore outer pipe 12 in the region, in which the outer periphery of the throttle valve 2 makes contact with or approaches to the bore inner periphery of the bore inner pipe 11 when the throttle valve 2 is in the full-closing position. The housing connecting ribs 31, 32 are apart from both the region, in which the first boss 8 and the second boss 208 are provided, and the region around the bore connecting rib 13, via which the bore inner pipe 11 is connected with the bore outer pipe 12. The first and second bosses 8, 208 are apart from the flange portion 17.

The bore inner pipe 11, which forms the throttle bore 7, floats with respect to the bore outer pipe 12, which constructs the outer shell of the throttle body 3, in the above structure of the throttle body 3. The axially one end portion of the outer wall of the bore outer pipe 12 on the lower side in FIG. 1 connects with the inner periphery of the flange portion 17 via the flange connecting ribs 20.

Thereby, in this structure, even when the motor housing portion 23 vibrates due to engine vibration, the vibration in the motor housing portion 23 is not apt to be propagated to the bore outer pipe 12 connected to the bore inner pipe 11 via the housing connecting ribs 31, 32, the flange portion 17, and the flange connecting ribs 20.

Besides, even when strain and stress internally arise in the housing connecting ribs 31, 32 due to the vibration in the motor housing portion 23, the internal strain and internal stress are not apt to be propagated to the bore outer pipe 12 via the flange portion 17 and the flange connecting ribs 20.

Furthermore, when the throttle body 3 is integrally formed of resin, internal strain and internal stress may arise in the housing connecting ribs 31, 32. As a result, the throttle body 3 may deform after forming of resin. In this situation, specifically, contraction may arise in the flange portion 17 and the motor housing portion 23 after forming thereof. However, in this structure, strain and deformation in all the housing connecting ribs 31, 32, the flange portion 17, and the motor housing portion 23 are not apt to be propagated to the bore outer pipe 12 of the bore wall portion via the housing connecting ribs 31, 32, the flange portion 17, and the flange connecting ribs 20, because of providing the flange connecting ribs 20.

Furthermore, deformation in the throttle body 3 after forming of resin, specifically contraction arising in the bore outer pipe 12, the flange portion 17, and the motor housing portion 23 after forming thereof are not apt to be propagated from the bore outer pipe 12 to the bore inner pipe 11 via the portion, in which the first boss 8 and the second boss 208 are provided, and the bore connecting rib 13. Thus, deformation in the throttle body 3, specifically, contraction in the bore outer pipe 12, the flange portion 17, and the motor housing portion 23 are not apt to exert influence directly to the diametric dimension of the throttle bore of the bore inner pipe 11.

Furthermore, the throttle body 3 is formed integrally with the flange connecting ribs 20 that connect the outer wall of the bore outer pipe 12 on the axially one end portion on the lower side in FIG. 1 with the inner periphery of the flange portion 17. The arch-shaped spaces 21 are formed between the flange connecting ribs 20, which are adjacent to each other. That is, the arch-shaped spaces 21 are formed between the outer wall of the axially one end portion of the bore outer pipe 12 on the lower side in FIG. 1 and the inner periphery of the flange portion 17.

Here, the throttle body 3 may deform after forming of resin thereof. Specifically, the flange portion 17 may deform when the flange portion 17 is screwed to the bracket 500 of one of the intake manifold 520 and the surge tank 510. As a result, internal stress may arise in the flange portion 17. However, in this structure, even when the throttle body 3 is integrally formed of resin, and even when the flange portion 17 deform resulting in arising internal stress in the flange portion 17, the internal stress in the flange portion 17 may be distributed to the motor housing portion 23 via the housing connecting ribs 31, 32.

The throttle body 3 may deform after forming of resin thereof. Specifically, the flange portion 17 may deform when the flange portion 17 is screwed to the bracket 500, while strain arises in the flange portion 17. However, in this structure, strain arising in the flange portion 17 is not apt to exert influence directly to the diametric dimension of the throttle bore of the bore inner pipe 11.

Thus, deformation in the throttle body 3, such as internal strain caused by internal stress arising in the housing connecting ribs 31, 32 due to the vibration in both the motor housing portion 23 and the engine 530, contraction in forming the bore outer pipe 12, the flange portion 17, and the motor housing portion 23, and strain arising in the flange portion 17 when the throttle body 3 is assembled to the engine 530, are not apt to exert influence directly to the diametric dimension of the throttle bore of the bore inner pipe 11. That is, accuracy of the clearance between the bore inner periphery of the bore inner pipe 11 and the outer periphery of the disc-shaped portion of the throttle valve 2 can be enhanced. Therefore, the roundness of the throttle bore periphery of the bore inner pipe 11 can be enhanced, so that the amount of intake air, which leaks when the throttle valve 2 is in the full-closing position in the idling operation, can be restricted from increasing. Thus, airtightness of the throttle valve 2 in the full-closing position can be maintained. Thereby, rotation speed of the engine 530 in the idling operation can be restricted from increasing over a target speed, and fuel consumption can be restricted from increasing in the idling operation.

Furthermore, when the throttle valve 2 is rotated to the full-closing position, the bore inner periphery of the bore inner pipe 11 does not interfere and does not make contact with the outer periphery of the disc-shaped portion of the throttle valve 2, before the throttle valve 2 is rotated to be in the full-closing position. Thereby, throttle valve 2 can be restricted from causing a failure in operation thereof, and can be restricted from arising seizure, i.e., valve lock in movement thereof. Thus, the throttle opening degree may conform to the accelerator position, so that drivability may be improved.

[Variation]

The central axis of the bore inner pipe 11 can be eccentrically arranged with respect to the central axis of the bore outer pipe 12 to construct the throttle bore portion having an eccentric double-pipe structure. That is, the axial center of the bore inner pipe 11 can be eccentrically arranged on one side in the radial direction of the bore outer pipe 12, e.g., vertically lower side of the bore outer pipe 12 in its installation condition. Here, the radial direction of the bore outer pipe 12 is perpendicular to the direction of the central axis of the bore outer pipe 12. Alternatively, the axial center of the bore inner pipe 11 can be eccentrically arranged on another side of the bore outer pipe 12 in the radial direction of the bore outer pipe 12, e.g., vertically upper side of the bore outer pipe 12 in its installation condition.

The throttle bore portion of the throttle body 3 may have a single pipe structure, which is constructed of a single pipe-shaped portion. Even in this structure, the housing connecting ribs 31, 32 are not connected directly with the outer wall of the throttle bore portion, but connected directly with the flange portion 17 that extends from the outer wall of one axial end portion of the throttle bore portion to the radially outer side. Thereby, the effect equivalent to that of the first embodiment can be produced.

The throttle valve 2 may be formed of a resinous material or a metallic material, and the throttle valve 2 may be inserted into a valve-insertion hole formed in the valve supporting portion of the throttle shaft 1. In this structure, the throttle valve 2 may be screwed to the valve supporting portion of the throttle shaft 1 using a fastening member such as a screw.

The blockade recess parts 14, 15 are used to restrict the throttle valve 2 from icing in a cold period such as winter, without additional components, such as an additional piping member for introducing engine-cooling water into the throttle body 3. Alternatively, only the blockade recess part 14 may be provided in the bore wall portion for blocking moisture or liquid flowing from the upper side of the throttle valve 2 into the bore wall portion along with the inner periphery of the intake pipe. Thus, the number of the parts of the intake control device can be decreased, so that the intake control device can be downsized, and can be produced at a low cost.

A bypass passage can be provided on the outer peripheral side of the bore outer pipe 12 for bypassing the throttle valve 2. Furthermore, an idling speed control valve (ISC valve) can be provided in the bypass passage for controlling idling speed of the engine by adjusting a flow amount of air passing through the bypass passage.

An outlet port of blowby gas discharged from a positive crankcase ventilator (PCV, blowby gas reduction device) or a purge tube connected to a vapor recovery equipment for recovering vaporized gasoline may be connected to the intake pipe located on the upstream side of intake airflow with respect to the bore wall portion of the throttle body 3. In this case, engine oil contained in blowby gas may accumulate to be deposit on the inner wall of the intake pipe. However, in this structure, foreign material such as mist or deposit of blowby gas flowing along with the inner wall of the intake pipe can be blocked by the blockade recess part 14, so that the throttle valve 2 and the throttle shaft 2 can be restricted from causing a failure in operation thereof.

The throttle valve 2 and the throttle body 3 may be integrally formed of a resinous material such as resin based composite materials, for example, polybutylene terephthalate containing 30% of glass fiber (PBTG30). The resinous material is obtained by mixing a filling material such as low-cost glass fiber, carbon fiber, aramid fiber, or boron fiber into a resinous material such as molten thermoplastic resin, which is heated to be in a molten state. The throttle valve 2 may be formed of a metallic material.

The structures of the above embodiments can be combined as appropriate. The manufacturing methods of the above embodiments can be combined as appropriate.

Various modifications and alternations may be diversely made to the above embodiments without departing from the spirit of the present invention.

What is claimed is:

1. An intake control device for an internal combustion engine, the intake control device comprising:

a throttle valve that rotates to control an amount of intake air flowing into a combustion chamber of the internal combustion engine; and a throttle body that includes a throttle bore portion that is in a substantially cylindrical shape, the throttle bore portion defining a throttle bore that is in a substantially circular shape, the throttle valve being accommodated in the throttle bore, wherein the throttle body further includes a motor housing portion, which is in a substantially cylindrical shape, being arranged on an outer side of the throttle bore portion with respect to a radial direction of the throttle bore portion, the radial direction of the throttle bore portion being substantially perpendicular to an axial direction of the throttle bore portion, the motor housing portion defines a motor accommodating hole, in which a motor is accommodated to rotate the throttle valve, the throttle body further includes a flange portion that extends from a first axial end portion of the throttle bore portion to an outer side in the radial direction of the throttle bore portion, the throttle body being connected to a supporting member, which is fixed to the internal combustion engine, via the flange portion, the throttle body is formed of resin integrally with a housing connecting rib that connects the flange portion directly with the motor housing portions, the throttle bore portion is spaced from the motor housing portion via the flange portion, the throttle bore portion has an annular portion which has a substantially annular shape to define said throttle bore, the annular portion substantially corresponds to an outer periphery of the throttle valve when in a full-closing position, and the annular portion of the throttle bore portion is indirectly coupled to the flange portion.

2. The intake control device according to claim 1, wherein the throttle body is formed integrally with a flange connecting rib that connects the first axial end portion of the throttle bore portion directly with the flange portion.

3. The intake control device according to claim 1, wherein the supporting member is a bracket that is provided to an upstream end of one of an intake manifold of the internal combustion engine and a surge tank of the internal combustion engine, the flange portion defines at least one bolt hole, through which a fastening member is inserted to screw the throttle body onto an end face of the bracket, and the flange portion defines a space with respect to an outer periphery of the throttle bore portion.

4. The intake control device according to claim 1, further comprising:

a throttle shaft that rotates integrally with the throttle valve;

a first bearing that rotatably supports a first axial end of the throttle shaft; and a second bearing that rotatably supports a second axial end of the throttle shaft.

5. The intake control device according to claim 4, wherein the throttle body is formed integrally with a first bearing supporting portion and a second bearing supporting portion, the first bearing supporting portion is arranged on a first side with respective to a direction, which is substantially perpendicular to an axial direction of an average flow of intake air flowing through the throttle bore of the throttle body, the second bearing supporting portion is arranged on a second side with respective to the direction, which is substantially perpendicular to the axial direction of the average flow of intake air flowing through the throttle bore of the throttle body, and the first bearing supporting portion and the second bearing supporting portion are arranged to be apart from a location, in which at least one of the flange portion and the housing connecting rib is provided.

6. The intake control device according to claim 1, wherein the throttle bore portion has a double-pipe structure that includes an inner cylindrical portion defining said annular portion and an outer cylindrical portion, the outer cylindrical portion is arranged on an outer side of the inner cylindrical portion in a radial direction of the inner cylindrical portion, the outer cylindrical portion and the inner cylindrical portion define a cylindrical space therebetween, the throttle body includes a bore connecting rib that connects an outer periphery of the inner cylindrical portion directly with an inner periphery of the outer cylindrical portion, the flange portion extends from the first axial end portion of the outer cylindrical portion to an outer side in the radial direction of the outer cylindrical portion, and the bore connecting rib is arranged to be apart from a location, in which the flange portion extends from the first axial end portion of the outer cylindrical portion.

7. The intake control device according to claim 6, wherein the throttle body is formed integrally with a flange connecting rib that connects the first axial end portion of the outer cylindrical portion directly with the flange portion.

8. The intake control device according to claim 6, wherein the supporting member is a bracket that is provided to an upstream end of one of an intake manifold of the internal combustion engine and a surge tank of the internal combustion engine, the flange portion defines at least one bolt hole, through which a fastening member is inserted to screw the throttle body onto an end face of the bracket, and the flange portion defines a space with respect to an outer periphery of outer cylindrical portion.

* * * * *